UNITED STATES PATENT OFFICE.

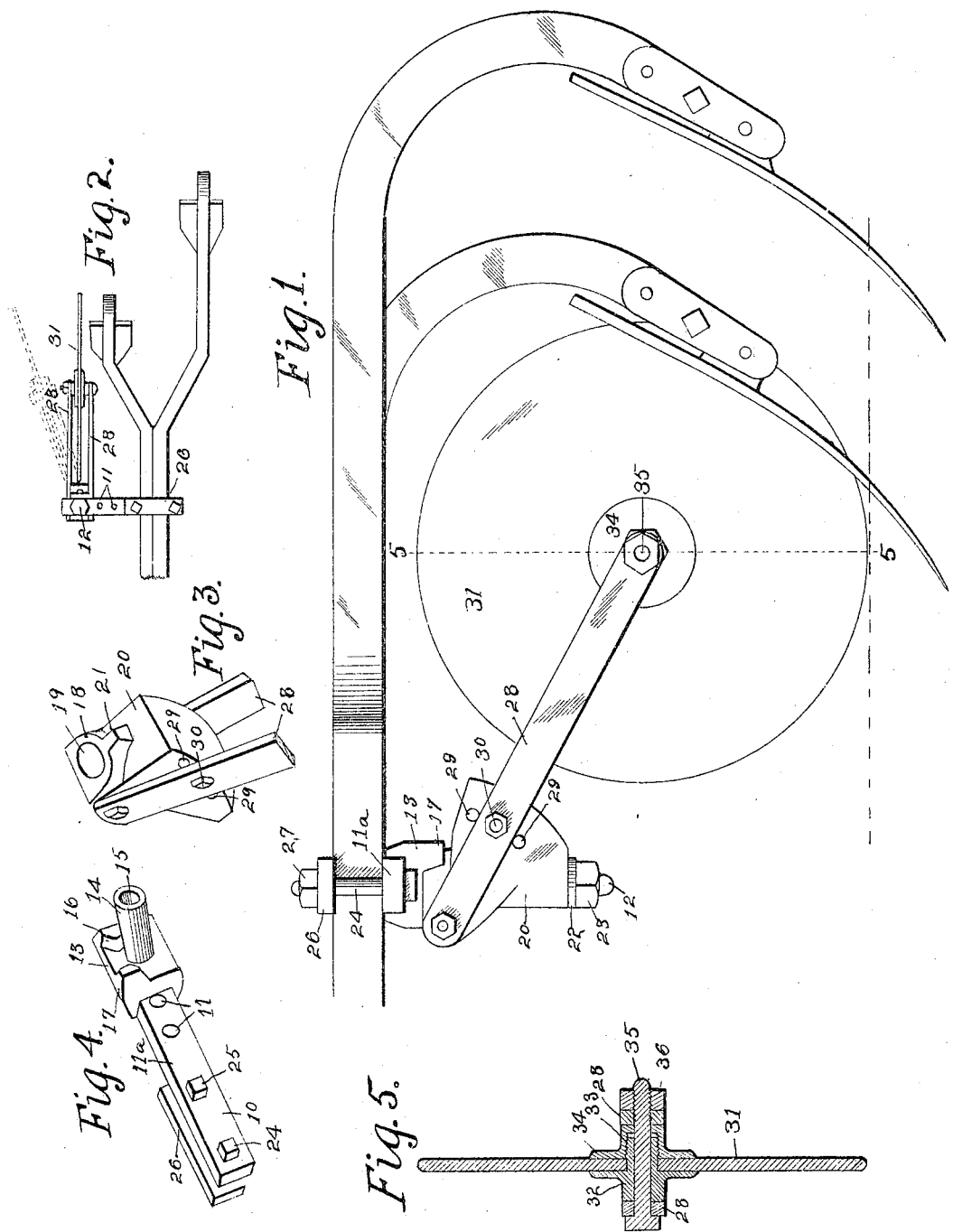

JOHN L. BALMER, OF KELLOGG, IOWA.

ROLLING SHIELD FOR PLOWS.

No. 801,961.

Specification of Letters Patent.

Patented Oct. 17, 1905.

Application filed October 5, 1904. Serial No. 227,738.

*To all whom it may concern:*

Be it known that I, JOHN L. BALMER, a citizen of the United States, residing at Kellogg, in the county of Jasper and State of Iowa, have invented certain new and useful Improvements in Rolling Shields for Plows, of which the following is a specification.

The objects of my invention are to provide a shield for corn-plows which will cut the sod outside of the plow to which it is attached, so that the roots of the corn which is being plowed will not be disturbed by the passing of the plow over the ground-surface between the rows of corn.

It is my object, further, to provide a shield of this kind which will enable the plow to approach very near to the rows of corn which are being cultivated without being in danger of tearing the roots of corn by the plow.

A further object is to provide a lower shield which can be attached to the ordinary corn-plow easily and readily and which is so mounted that it will swing easily to the right or left of the line of advance of the plow, and thus avoid any small obstruction which may be in its path.

A further object is to provide a rolling shield which can be adjusted readily and easily to cut the dirt to different depths and, further, to enable the operator to adjust the shield very near to or some distance away from the plows.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1 is a side elevation of the rolling shield attached to the beam of the ordinary corn-plow, said beam being broken away at its forward end, as it is of the ordinary construction. Fig. 2 is a plan view of the same, showing in dotted lines the shield swung to the right of the line of advance of the plow. Fig. 3 is a detail view of the plow to which the shield is pivotally mounted and showing the arms between which the shield is mounted broken away. Fig. 4 is a detail view of that portion of the device which is designed to be attached to the beam of the plow, and Fig. 5 is a vertical sectional view of the shield and shows the way in which the shield is attached to the arms which hold it in position. This is cut on the line 5 5 of Fig. 1.

Referring to the accompanying drawings, I have used the reference-numeral 10 to indicate the bar which is attached immediately beneath the beam and across its under surface. This bar has a series of openings 11 extending through it, designed to admit the bolt 12, which is designed to hold in position the block 13 relative to said bar 10 and also maintain in position the block for supporting the arms which hold in position the disk, both of which are to be described hereinafter. The block 13 has an opening extending through it and has the collar 14 extending downwardly from its central portion, said collar having the opening 15 in its central portion, said opening being directly in line with the opening on the interior of the block 13. Extending downwardly from the block 13 are the lugs 16 and 17, said lugs being on the extreme ends of the block 13 and near the side thereof. The edges of the blocks adjacent to each other flare outwardly and are so arranged as to allow the lateral movement of the disk, as hereinafter described.

Mounted on the collar 15 is a sleeve 18, having an opening 19 extending throughout its entire length. This sleeve 18 is mounted in the block 20 and extends vertically through it. The sleeve 18 has a lug 21 extending rearwardly from its central portion. When the sleeve 18 is slipped upon the collar 14, the lug 21 engages the under portion of the block 13 and is between the lugs 16 and 17. When the lug 21 is in position against the under surface of the block 13, the bolt 12 is passed through the opening in the block 13 and through the opening 15 in the sleeve 14 until it projects below the lower portion of the block 20. A washer 22 is then placed on the lower end of said bolt, and a nut 23 is screwed on this bolt and against the washer 22, and the blocks 13 and 20 are held in position relative to each other, and the block 20 is capable of a slight rocking movement relative to the block 13. The movement of the block 20 is limited, however, by means of the lugs 16 and 17, as the flaring edges of said lugs 16 and 17 are engaged by the lug 21, thus limiting the rocking movement of the block 20.

Extending through the bar 10 and upwardly therefrom are the bolts 24 and 25, said bolts also extending through the bar 26, which is designed to be mounted above and across the beam of the cultivator, so that the bolt 24 is on one side of the beam and the bolt 25 is on the other side of said beam. When the nuts 27 are screwed up sufficiently tight, the bars 24 and 25 approach each other, and they, together with the bolts, form a clamp which maintains the device in position relative to the beam of the corn-plow.

Pivotally attached to the forward upper portion of each side of the block 20 is an arm 28, which extends rearwardly and downwardly from its point of attachment. Extended transversely of the rear portion of the block 20 is a series of openings 29. Extending through each of the bars 28 is an opening similar to the openings 29, said openings being designed to admit the bolt 30, so that the bars can be raised and lowered relative to the block 20 by simply removing the bolt from the bars 20 and the block 20 and inserted into another of the openings 29 in the block 20. Mounted as follows between the extreme lower ends of the arms 28 is the disk 31. Mounted partially on one side of the disk and extending through its central portion is a bearing 32, having a screw-threaded portion 33 thereon, which projects beyond the opposite side of the disk from which the body portion of the bearing is. Screwed to this screw-threaded portion 33 is a bearing 35, which is designed, together with the bearing 32, to form a complete bearing upon which the disk is designed to rotate on the bolt 35, which passes through said bearings and also through openings in the lower ends of each of the arms 28. The arm 28, which is away from the head of the bolt 25, is screw-threaded, and into this screw-threaded portion the screw-threaded portion of the bolt 35 is designed to pass and maintain the arms 28 firmly in position relative to each other and relative to the bearings 32 and 34 and also to provide a locking device, together with the nut 36, which forms a portion of the bolt 35.

In practical use and assuming that the parts are assembled as shown in Fig. 1 of the drawings, and attached to the beam of the cultivator, the device is in readiness for use, and the operator has simply to adjust the shield in the position desired for use, and this can be done by placing the disk so that it will rotate near the plow or some distance away from it and which can be adjusted vertically to cut the ground-surface at a greater or less depth. The plow is used in the ordinary way.

Having thus described my invention, what I claim, and desire to secure by Letters Patent of the United States therefor, is—

1. In a device of the class described, a block having an opening through it, a collar secured to the block, two lugs extending downwardly from the block, a sleeve having an opening extending through it, a lug extending rearwardly from the sleeve designed to operate between the lugs on the collar and to limit the rocking movement of the sleeve, a block attached to the sleeve, a bolt for rockingly securing the sleeve and the parts of the device attached to it to the collar and the collar to the beam of a cultivator, and a disk pivotally attached to the block which is secured to the sleeve, for the purposes stated.

2. In a device of the class described, a block having an opening through it, a collar secured to the block having an opening through it, two lugs extending downwardly from the block, a sleeve, a lug extending rearwardly from the sleeve designed to operate between the lugs on the collar and to limit the rocking movement of the sleeve, a block attached to the sleeve, a bolt for rockingly securing the sleeve and the parts of the device attached to it to the collar and the collar to the beam of a cultivator, a rotary disk pivotally secured to the block which is secured to the sleeve, and means for adjustably maintaining the shield in position relative to the block which is secured to the sleeve.

JOHN L. BALMER.

Witnesses:
C. J. IRISH,
C. M. PAUL.